United States Patent
Motomura et al.

(10) Patent No.: US 11,001,066 B2
(45) Date of Patent: May 11, 2021

(54) INK JET RECORDING METHOD AND INK JET RECORDING APPARATUS

(71) Applicant: CANON KABUSHIKI KAISHA, Tokyo (JP)

(72) Inventors: Maki Motomura, Tokyo (JP); Kouhei Nakagawa, Tokyo (JP); Ryota Takeuchi, Yokohama (JP); Minako Kawabe, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/592,327

(22) Filed: Oct. 3, 2019

(65) Prior Publication Data
US 2020/0108614 A1    Apr. 9, 2020

(30) Foreign Application Priority Data
Oct. 4, 2018 (JP) ............... JP2018-189025

(51) Int. Cl.
*B41J 2/165* (2006.01)
*C09D 11/322* (2014.01)

(52) U.S. Cl.
CPC ....... *B41J 2/16585* (2013.01); *B41J 2/16541* (2013.01); *C09D 11/322* (2013.01)

(58) Field of Classification Search
CPC ... B41J 2/16541; B41J 2/16535; B41J 2/2107
See application file for complete search history.

(56) References Cited

U.S. PATENT DOCUMENTS

| | | | |
|---|---|---|---|
| 2002/0014184 A1 | 2/2002 | Yeh et al. | |
| 2011/0115846 A1* | 5/2011 | Suzuki | B41J 2/16532 |
| | | | 347/30 |
| 2012/0299996 A1 | 11/2012 | Kano et al. | |

FOREIGN PATENT DOCUMENTS

| | | |
|---|---|---|
| JP | H06-135004 A | 5/1994 |
| JP | 2003-535949 A | 12/2003 |
| JP | 2012-166374 A | 9/2012 |
| WO | 01/94476 A2 | 12/2001 |

* cited by examiner

*Primary Examiner* — Julian D Huffman
(74) *Attorney, Agent, or Firm* — Venable LLP

(57) ABSTRACT

The ink jet recording method is an ink jet recording method of recording an image on a recording medium using an ink jet recording apparatus including a recording head and a recovery mechanism for recovering an ejection state of pigment ink from ejection orifices. The recording head includes a first flow path and a second flow path allowing an ejection orifice and a recording element to communicate with each other and through which ink flows between the ejection orifice and the recording element. The ink jet recording method includes (i) a first cleaning of allowing the ink in the first flow path to flow to the second flow path while performing wiping and suction with a suction wiper; or (ii) a second cleaning of allowing the ink in the first flow path to flow to the second flow path after performing wiping and suction with a suction wiper.

14 Claims, 8 Drawing Sheets

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, an ink jet recording apparatus has been increasingly used in offices or the commercial printing field. In addition, the ink jet recording apparatus by which a recording speed is further increased and an optical density of an image to be recorded is further increased has been required. In order to increase the recording speed, a method of recording an image by using a line type recording head (line head), that is, a one pass recording method, is more advantageous than a multi-pass recording method in which a serial type recording head (serial head) is used.

In general, the optical density of the image can be increased by increasing aggregation of a pigment. In order to increase the optical density of the recorded image, various types of ink have been studied so far.

However, when increasing the aggregation of the pigment, the reliability at an ejection surface of the ink jet recording apparatus tends to decrease, for example, the ink left for a long period of time is likely to be stuck in the vicinity of an ejection orifice. Moreover, it is difficult for the line head to perform a process of recovering (recovery process) an ejection state of the ink as compared with the serial head in terms of a configuration of an apparatus. In addition, when making the line head long in order to increase the recording speed, in a recovery method such as a conventional cap suction method, the suction amount of ink per ejection orifice is reduced. Further, in a case where a difference in fluid resistance between an ejection orifice at which ink is stuck and an ejection orifice at which ink is not stuck, the suction amount of ink at the ejection orifice in which the sticking has further progressed is reduced and it is difficult to recover the ejection state of the ink normally. Therefore, even in a case where the time for the recovery process is increased or the suction force for the recovery process is strengthened, it is difficult to improve the recovery efficiency, and the consumption amount of ink required to recovery is also increased.

In order to solve the above problems, for example, a cleaning mechanism for an ink jet recording apparatus, in which an elastic material having a blade shape and a suction unit are combined is proposed (Japanese Patent Application Laid-Open No. 2012-166374). The cleaning mechanism is a mechanism for sucking ink thickened or ink stuck in an ink flow path while moving the elastic material and the suction unit in an ejection orifice array direction and scraping paper powder or dust stuck around an ejection orifice.

SUMMARY OF THE INVENTION

It was newly found that in a case where an image is recorded by an ink jet recording apparatus to which the cleaning mechanism proposed in Japanese Patent Application Laid-Open No. 2012-166374 is applied, unevenness is likely to occur.

An object of the present invention is to provide an ink jet recording method capable of implementing an excellent sticking recovery property and recording an image having a high optical density and no unevenness. Another object of the present invention is to provide an ink jet recording apparatus using the ink jet recording method.

The above objects are achieved by the following invention. According to the present invention, there is provided an ink jet recording method of recording an image on a recording medium using an ink jet recording apparatus including: a recording head including an ejection orifice array configured by arranging ejection orifices ejecting aqueous ink containing a pigment in a predetermined direction; and a recovery mechanism for recovering an ejection state of the aqueous ink from the ejection orifices, the recording head further including a recording element generating energy for ejecting the aqueous ink, and a first flow path and a second flow path allowing the ejection orifice and the recording element to communicate with each other and through which the aqueous ink flows between the ejection orifice and the recording element, and the recovery mechanism being a suction wiper formed by combining a wiper formed of an elastic material and a suction unit sucking the aqueous ink in the ejection orifices, the ink jet recording method including:
(i) a first cleaning of allowing the aqueous ink in the first flow path to flow to the second flow path simultaneously with sucking the aqueous ink in the ejection orifices while wiping a surface on which the ejection orifice array is formed in an arrangement direction of the ejection orifice array, with the suction wiper; or
(ii) a second cleaning of allowing the aqueous ink in the first flow path to flow to the second flow path after sucking the aqueous ink in the ejection orifices while wiping a surface on which the ejection orifice array is formed in an arrangement direction of the ejection orifice array, with the suction wiper.

According to the present invention, it is possible to provide the ink jet recording method capable of implementing an excellent sticking recovery property and recording an image having a high optical density and no unevenness. In addition, according to the present invention, it is possible to provide the ink jet recording apparatus using the ink jet recording method.

Further features of the present invention will become apparent from the following description of exemplary embodiments with reference to the attached drawings.

DESCRIPTION OF THE EMBODIMENTS

Hereinafter, the present invention is described in more detail with reference to the preferred embodiments. In the present invention, in a case where a compound is a salt, the salt is dissociated into ions and is present in ink, but for the convenience, the expression "contains a salt" is used. In addition, aqueous ink for ink jet is simply referred to as "ink". Values of physical properties are, but not particularly limited to, values at normal temperature (25° C.).

<Ink Jet Recording Method>

A pigment is dispersed in ink by various methods. Examples of a pigment dispersed by a representative dispersion method may include a self-dispersible pigment and a resin-dispersed pigment. The self-dispersible pigment is a pigment in which an ionic group is bonded directly or through another atomic group to a particle surface thereof, and is dispersed by electrostatic repulsion generated by an electrical double layer formed in the ionic group. A counter ion is present in the vicinity of the ionic group. Since the counter ion having a low concentration does not affect the electrical double layer in ink in which a liquid component does not evaporate, a dispersion state of the pigment is stably maintained. On the other hand, since the concentration of the counter ion is increased when the amount of liquid component in the ink is decreased, the electrical double layer is compressed, the electrostatic repulsion disappears, and the pigment thus aggregates. Therefore, in a case where ink containing a self-dispersible pigment is used as a coloring material, a pigment rapidly aggregates on a recording medium and the amount of pigment sinking in the recording medium is decreased, such that an optical density of an image is increased. However, since the pigment tends to aggregate also at an ejection orifice of a recording head, a sticking recovery property of ink tends to deteriorate.

In the resin-dispersed pigment in which a pigment is dispersed by a resin dispersant, when a liquid component evaporates, steric repulsion by the resin dispersant and holding of the liquid component of the resin dispersant are generated. Therefore, although the resin-dispersed pigment has a weak aggregation force as compared with the self-dispersible pigment, a viscosity increase and sticking may occur, such that the sticking recovery property of ink which is left for a long period of time in the ejection orifice tends to deteriorate.

From the above reason, it could be said that, in ink in which a pigment having high aggregation is included, the optical density of the image and the sticking recovery property have a trade-off relationship. In particular, in a case where a long line head is left for a long period of time in order to increase the recording speed, it is difficult to sufficiently recover an ejection state of ink in a cleaning mechanism such as a conventional cap suction.

Figure 2:
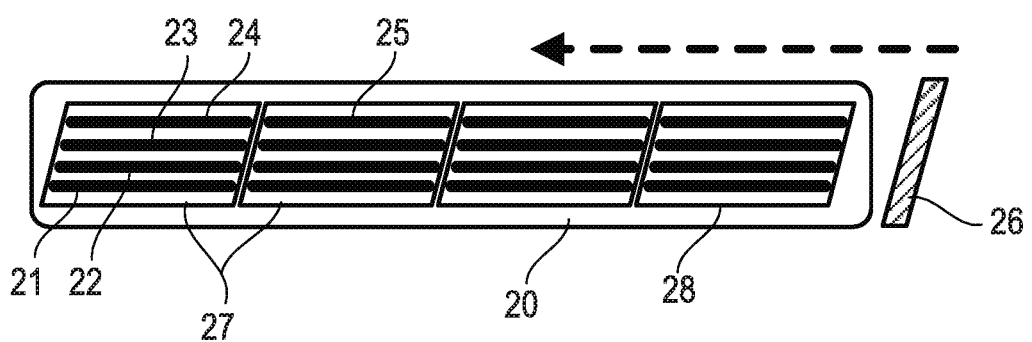
FIG. 2 is a schematic view illustrating an example of a recording head and a recovery mechanism constituting the ink jet recording apparatus of the present invention.

As a result of studies, the inventors of the present invention found that it is possible to record an image having a high optical density and improve a sticking recovery property by the following configuration. FIG. 2 is a schematic view illustrating an example of a recording head and a recovery mechanism constituting the ink jet recording apparatus of the present invention. The ink jet recording method of the present invention is a method of recording an image on a recording medium using an ink jet recording apparatus including a recording head 20 including ejection orifices ejecting aqueous ink and a recovery mechanism 26, as illustrated in FIG. 2. In the recording head 20, recording element substrates 27 including ejection orifice arrays 25 formed by arranging a plurality of ejection orifices in a predetermined direction are arranged. The recording element substrates 27 are arranged in line with each other as illustrated in FIG. 2, and may be arranged in zigzag. The recording head is preferably a so-called in-line type full multi-head in which a plurality of recording element substrates are arranged in line with each other.

In the recording element substrate 27, a plurality of ejection orifice arrays (first ejection orifice array 21, second ejection orifice array 22, third ejection orifice array 23 and fourth ejection orifice array 24) corresponding to each color of ink are formed. For example, a first ink is ejected from the first ejection orifice array 21 and a second ink is ejected from the second ejection orifice array 22. The recovery mechanism 26 is a mechanism for recovering the ejection state of ink from the ejection orifice. The recovery mechanism 26 includes a wiper formed of an elastic material and a suction unit sucking the ink in the ejection orifices. The recovery mechanism 26 is a so-called suction wiper wiping a surface (ejection orifice surface 28) on which the ejection orifice of the recording head 20 is formed in a direction indicated by the arrow.

However, it was found that in a case where the recovery mechanism described above is applied, unevenness on the recorded image tends to occur. In a case where the ejection state of ink is from the ejection orifices recovered while moving the recovery mechanism described above, a difference in time at which the ejection orifices are left in a state of being opened between a wiping start side and a wiping end side is generated. It was found that, since the liquid component of the ink evaporates during the time, a difference in ink viscosity between the ejection orifices on the wiping start side and the wiping end side is also generated, such that the amount of ink ejected is fluctuated and unevenness on the image occurs. Even though a wiping speed of the recovery mechanism is increased to eliminate the occurrence of the unevenness on the image, a suction time per ejection orifice is shortened and variations in the suction amount for each ejection orifice are generated, such that the unevenness on the image also occurs.

Figure 5:
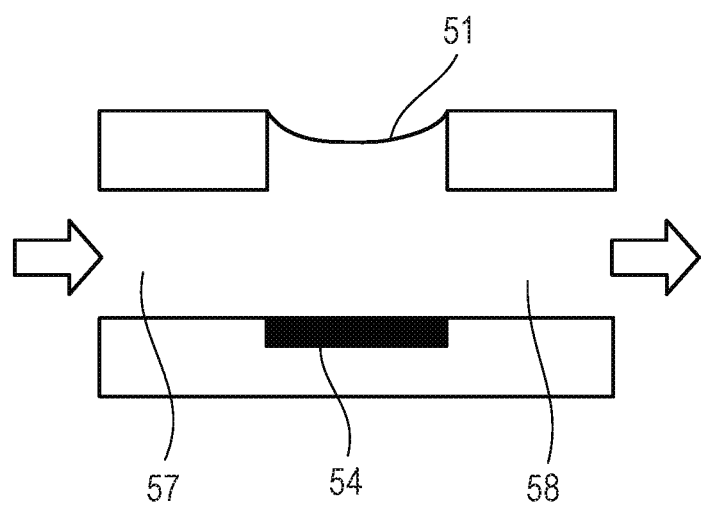
FIG. 5 is a schematic view illustrating an example of a recording head.

As a result of studies, the inventors of the present invention found that it is possible to suppress the occurrence of the image unevenness by the following configuration. FIG. 5 is a schematic view illustrating an example of a recording head. The recording head illustrated in FIG. 5 includes an ejection orifice 51 ejecting ink, a recording element 54 generating energy for ejecting the ink, a first flow path 57 and a second flow path 58 which communicate between the ejection orifice 51 and the recording element 54 and through which the ink flows between the ejection orifice 51 and the recording element 54. The ink flows from the first flow path 57 to the second flow path 58 (a direction indicated by the arrow in FIG. 5) through between the ejection orifice 51 and the recording element 54.

In the ink jet recording method of the present invention, an ink jet recording apparatus including the recording head having the configuration as illustrated in FIG. 5 is used. In addition, the ink jet recording method of the present invention includes a first cleaning or a second cleaning described below.

(i) First cleaning of allowing aqueous ink in a first flow path to flow to a second flow path simultaneously with sucking the aqueous ink in the ejection orifices while wiping an ejection orifice surface of an ejection orifice array in an arrangement direction, with a suction wiper (ii) Second cleaning of allowing aqueous ink in a first flow path to flow to a second flow path after sucking the aqueous ink in the ejection orifices while wiping an ejection orifice surface of an ejection orifice array in an arrangement direction, with a suction wiper In the first cleaning, the ink in the first flow path is allowed to flow to the second flow path simultaneously with performing wiping and suction by the suction wiper. That is, wiping and suction are performed in a state in which the ink flows. On the other hand, in the second cleaning, the ink in the first flow path is allowed to flow to the second flow path after performing wiping and suction by the suction wiper. That is, the ink is allowed to flow after performing wiping and suction. When any one of the first cleaning and the second cleaning is performed, the ink in the ejection orifice can be efficiently circulated, such that the difference in ink viscosity between the ejection orifices is eliminated and the occurrence of the image unevenness can thus be suppressed. The following configuration can be used as long as the effects of the present invention are obtained. In the case of performing the first cleaning, the ink may be allowed to flow after performing wiping and suction. Similarly, in the case of performing the second cleaning, wiping and suction are performed in a state in which the ink flows and the ink may also be allowed to flow continuously after performing the wiping and suction. Furthermore, the first cleaning or the second cleaning may be performed after the ink is allowed to flow in advance.

It is preferable that the ink in the first flow path is allowed to flow to the second flow path at a flow rate of 1.0 m/s or more. When the flow rate of the ink allowed to flow from the first flow path to the second flow path is less than 1.0 m/s, circulation efficiency tends to be reduced and the effect of suppressing the occurrence of the image unevenness may be slightly reduced. The flow rate of the ink is preferably 10.0 m/s or less.

In a case where evaporation of water in the ink occurs, the self-dispersible pigment aggregates more easily than the resin-dispersed pigment, and the viscosity increase and sticking are more likely to occur. Therefore, a viscosity thickened matter of the ink may not be sufficiently removed from the ejection orifice, when performing wiping and suction with the suction wiper without allowing the ink containing the self-dispersible pigment as a coloring material to flow from the first flow path to the second flow path. Accordingly, in a case where a pigment is a self-dispersible pigment, it is preferable that the first cleaning described above is performed, that is, the ink in the first flow path is allowed to flow to the second flow path simultaneously with performing wiping and suction by the suction wiper. By doing so, a liquid component is supplied, from the flow path through which the ink in which the amount of the liquid component such as water is relatively large flows, to the viscosity thickened matter of the ink in the ejection orifice in which the evaporation of the liquid component has progressed, such that flowability can be increased. In addition, the viscosity thickened matter of the ink is more efficiently removed, such that the occurrence of the image unevenness can be further suppressed.

In a case where wiping is performed while sucking the ejection orifice arrays corresponding to a plurality of types of ink at once, when a difference in fluid resistance between the ejection orifice arrays is not generated, a suction pressure applied to each ejection orifice array is uniform. However, when the difference in fluid resistance between the ejection orifice arrays is large, the ink in which the liquid component does not evaporate is sequentially supplied while preferentially sucking the ink from the ejection orifice array having a relatively low fluid resistance, such that the fluid resistance is further reduced. In addition, since the ink is hardly sucked from the ejection orifice array having a relatively high fluid resistance, the difference in fluid resistance between the ejection orifice arrays is further increased and it is difficult to improve the sticking recovery property. This is a problem that particularly occurs in a case of performing suction-wiping of the ejection orifice arrays corresponding to the plurality of types of ink at once.

In the ink containing the self-dispersible pigment as a coloring material, in a case where evaporation of water occurs, since the pigment tends to aggregate, the viscosity increase and sticking of the ink in the flow path are more likely to occur and the fluid resistance is relatively increased, as compared with the ink containing the resin-dispersed pigment as a coloring material. In this case, it is assumed that the first ink containing the self-dispersible pigment is ejected from the first ejection orifice array and the second ink containing the resin-dispersed pigment is ejected from the second ejection orifice array. In such a case, even though the ejection orifices constituting the ejection orifice arrays are wiped and sucked at once with the suction wiper, the viscosity thickened matter of the ink from the first ejection orifice may not be sufficiently sucked.

Therefore, in the above case, in the ink jet recording method of the present invention, a recovery operation is preferably performed while allowing the ink to flow so that the following conditions (i) and (ii) described below are satisfied. Accordingly, even in a case of using an ink set including a combination of the first ink containing the self-dispersible pigment and the second ink containing the resin-dispersed pigment, the sticking recovery property of the ejection orifice ejecting the first ink can be further improved. In addition, since the sticking recovery property of the ejection orifice ejecting the first ink is further improved, the ink is more sufficiently circulated in all the ejection orifices and the occurrence of the image unevenness can be further suppressed.

(i) The first ink in the first flow path is allowed to flow to the second flow path simultaneously with sucking the first ink in the ejection orifice while wiping the first ejection orifice array in an arrangement direction of the first ejection orifice array, with the suction wiper.

(ii) The second ink in the ejection orifice is sucked while wiping the second ejection orifice array in an arrangement direction of the second ejection orifice with the suction wiper without allowing the second ink in the first flow path to flow to the second flow path.

(Ink Jet Recording Apparatus)

Figure 1:
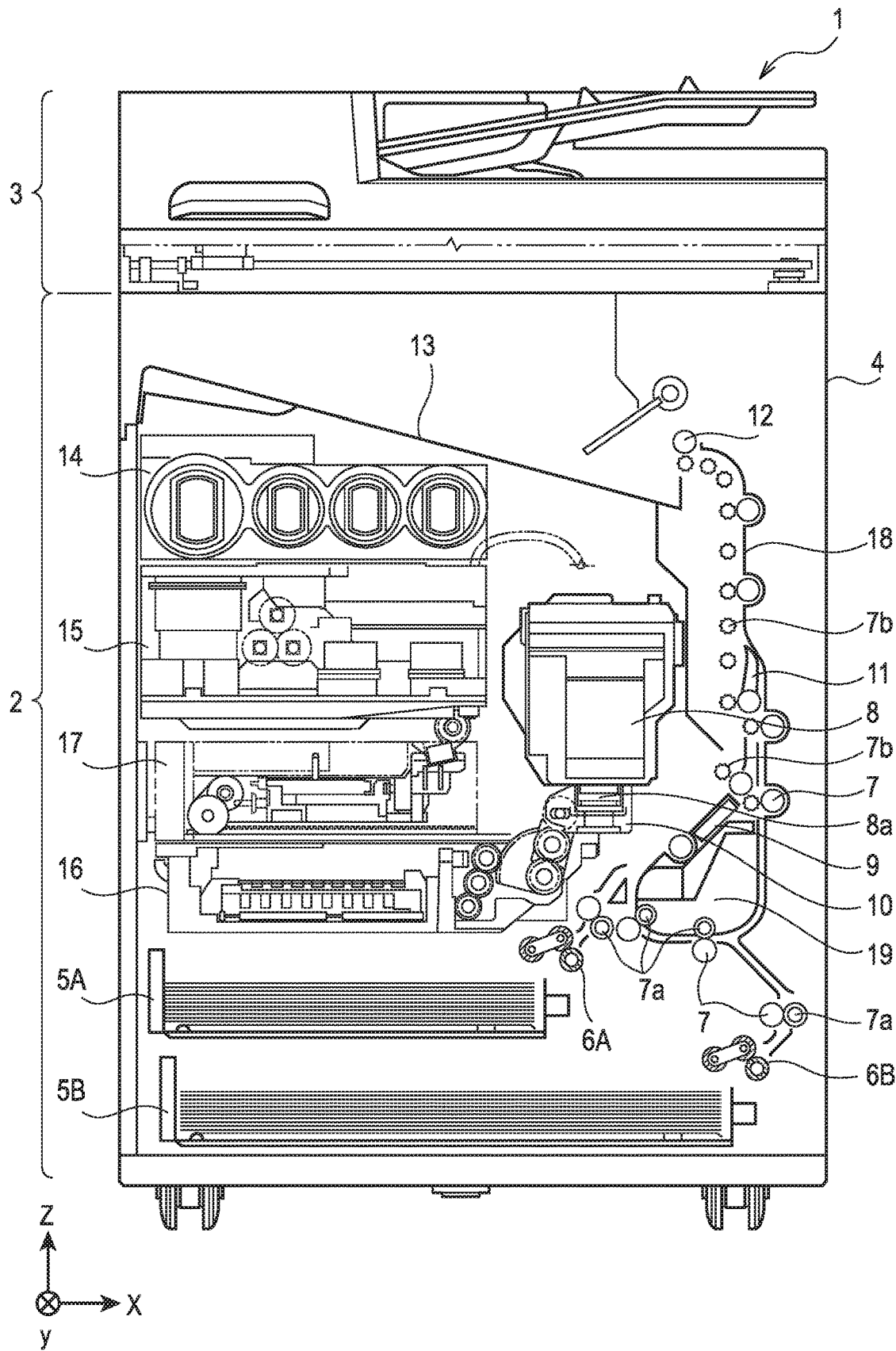
FIG. 1 is a cross-sectional view illustrating an ink jet recording apparatus according to an embodiment of the present invention.

FIG. 1 is a cross-sectional view illustrating an ink jet recording apparatus according to an embodiment of the present invention. In FIG. 1, x represents a horizontal direction, y represents an arrangement direction (depth direction) of ejection orifices of a recording head 8, and z represents a vertical direction. An ink jet recording apparatus 1 of the embodiment illustrated in FIG. 1 is in a so-called standby state where neither a recording operation nor a reading operation is performed.

The ink jet recording apparatus 1 illustrated in FIG. 1 is a composite machine including a recording portion 2 and a scanner portion 3. The ink jet recording apparatus 1 uses the recording portion 2 and the scanner portion 3 separately or in conjunction with each other to perform various processes related to a recording operation and a reading operation. The scanner portion 3 reads (scans) an original document. The ink jet recording apparatus of the present invention may not include a scanner portion.

In the recording portion 2, a first cassette 5A and a second cassette 5B for housing a recording medium having a cut sheet shape are detachably installed at the bottom of a casing 4 in the vertical direction. Relatively small recording mediums of up to A4 size are placed flat and housed in the first cassette 5A. Relatively large recording mediums of up to A3 size are placed flat and housed in the second cassette 5B. A first feeding unit 6A separating and feeding the housed recording mediums one by one is provided near the first cassette 5A. Similarly, a second feeding unit 6B is provided near the second cassette 5B. When the recording operation is performed, the recording mediums are selectively fed from either one of the cassettes.

Conveying rollers 7, a discharging roller 12, pinch rollers 7a, spurs 7b, a guide 18, an inner guide 19 and a flapper 11 are conveying mechanisms for guiding the recording medium in a predetermined direction. The conveying rollers 7 are drive rollers arranged on the upstream side and the downstream side of the recording head 8 and driven by a conveying motor (not illustrated). The pinch rollers 7a are driven rollers rotating together with the conveying rollers 7 while nipping the recording medium. The discharging roller 12 is a drive roller disposed on the downstream side of the conveying roller 7 and driven by the conveying motor (not illustrated). The spurs 7b nip and convey the recording medium together with the conveying rollers 7 and the discharging roller 12 disposed on the downstream side of the recording head 8.

The guide 18 is provided in a conveying path of the recording medium to guide the recording medium in a predetermined direction. The inner guide 19 is a member extending the y direction. The inner guide 19 has a curved side surface and guides the recording medium along the side surface thereof. The flapper 11 is a member for changing a direction in which the recording medium is conveyed in a duplex recording operation. A discharging tray 13 is a tray for stacking and holding the recording medium discharged by the discharging roller 12 after being subjected to the recording operation.

The recording head 8 is a full line type recording head. In the recording head 8, a plurality of ejection orifices ejecting ink based on recording data are arranged along the y direction within a range in which a width of the recording medium is covered. When the recording head 8 is in a standby position, an ejection orifice surface 8a of the recording head 8 is capped with a cap unit 10 as illustrated in FIG. 1. When the recording operation is performed, the direction of the recording head 8 is changed so that the ejection orifice surface 8a faces a platen 9. The platen 9 includes a flat plate extending in the y direction and supports the recording medium from the back when the recording operation is performed by the recording head 8.

An ink tank unit 14 separately stores ink of four colors to be supplied to the recording head 8. An ink supply unit 15 is provided in the midstream of a flow path connecting the ink tank unit 14 and the recording head 8 to adjust a flow rate of the ink supplied to the recording head 8 within a suitable range. A maintenance unit 16 includes the cap unit 10 and a wiping unit 17 and activates them at a predetermined timing to perform a maintenance operation for the recording head 8.

When using the ink jet recording apparatus illustrated in FIG. 1, first, the recording medium housed in the first cassette 5A or the second cassette 5B is conveyed in the apparatus and an image is recorded by the recording head 8 in the recording portion 2. The recording medium on which the image is recorded is discharged to the discharging tray 13 in a state where a surface after being subjected to recording (immediately before discharged) faces down in the direction of gravity, that is, an inverted state.

Figure 3A:
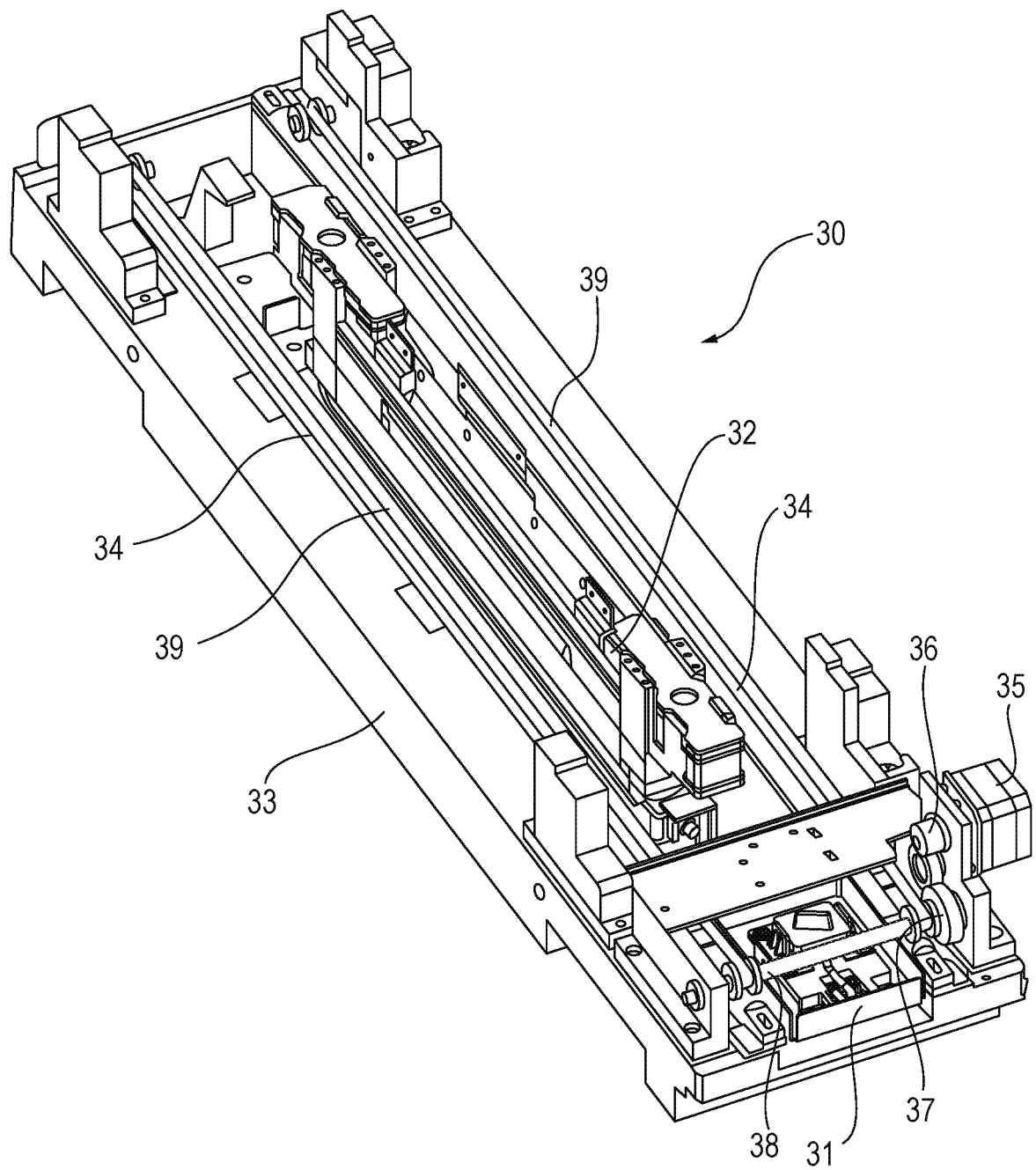
FIG. 3A is a perspective view illustrating an example of a cleaning mechanism in the ink jet recording apparatus.
Figure 3B:
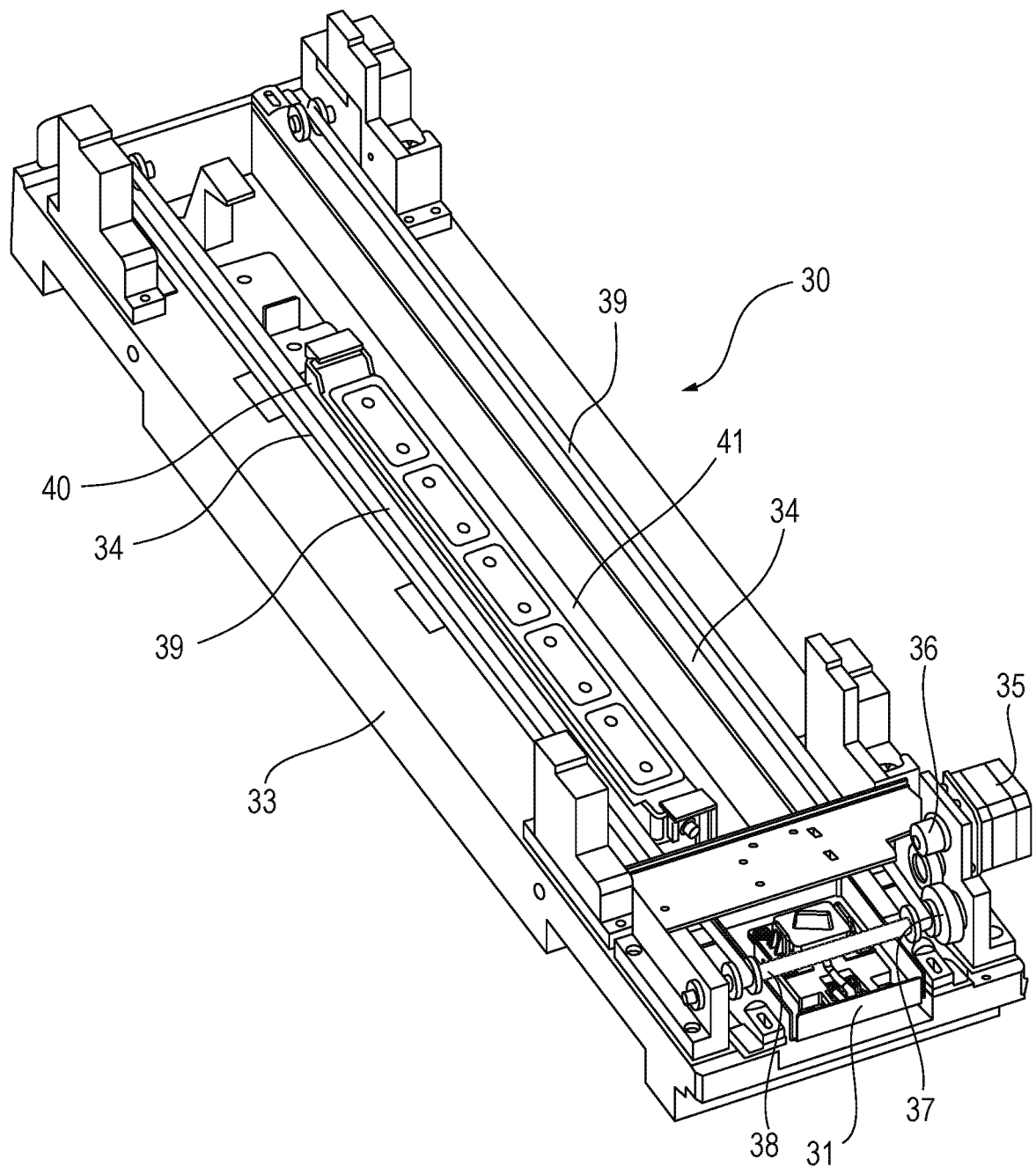
FIG. 3B is a perspective view illustrating an example of a cleaning mechanism in the ink jet recording apparatus.

In the ink jet recording method of the present invention, an ink jet recording apparatus including a recovery mechanism for recovering an ejection state of ink from an ejection orifice is used. The recovery mechanism is a suction wiper formed by combining a wiper formed of an elastic material and a suction unit sucking the ink in the ejection orifices. An example of a material of the wiper may include a material having elasticity. Specifically, a rubber material formed of a urethane resin (urethane rubber) can be exemplified. The suction wiper preferably has a blade-like partial structure. A recovery operation by the suction wiper (recovery mechanism) is performed, for example, in a cleaning mechanism in the ink jet recording apparatus. FIGS. 3A and 3B are perspective views illustrating an example of a cleaning mechanism in the ink jet recording apparatus. FIG. 3A illustrates a position of the recording head at the time of the recovery operation and FIG. 3B illustrates a position of the recording head at the time of non-recovery operation (at the time of recording).

As illustrated in FIG. 3A, a cleaning mechanism 30 includes a cleaning unit 31, a moving mechanism for moving the cleaning unit 31 in a longitudinal direction of a recording head 32 and a frame 33 integrally supporting the cleaning unit 31 and the moving mechanism. A suction wiper to be described later is disposed in the cleaning unit 31 and wipes ink and the like adhered to an ejection orifice surface of the recording head 32. The cleaning unit 31 is supported by two shafts 34 and is reciprocated by the moving mechanism in the longitudinal direction of the recording head 32. The moving mechanism includes a drive motor 35, reduction gears 36 and 37, a drive shaft 38 and two belts 39. The moving mechanism is a mechanism for moving the cleaning unit 31 by a rotational force transmitted from the drive motor 35. As illustrated in FIG. 3B, a cap holder 40 supports a cap 41 in close contact with the ejection orifice surface of the recording head and capping the ejection orifice surface. Drying of the ejection orifice surface is suppressed by capping the ejection orifice surface so that the cap 41 covers the ejection orifice surface.

Figure 4:
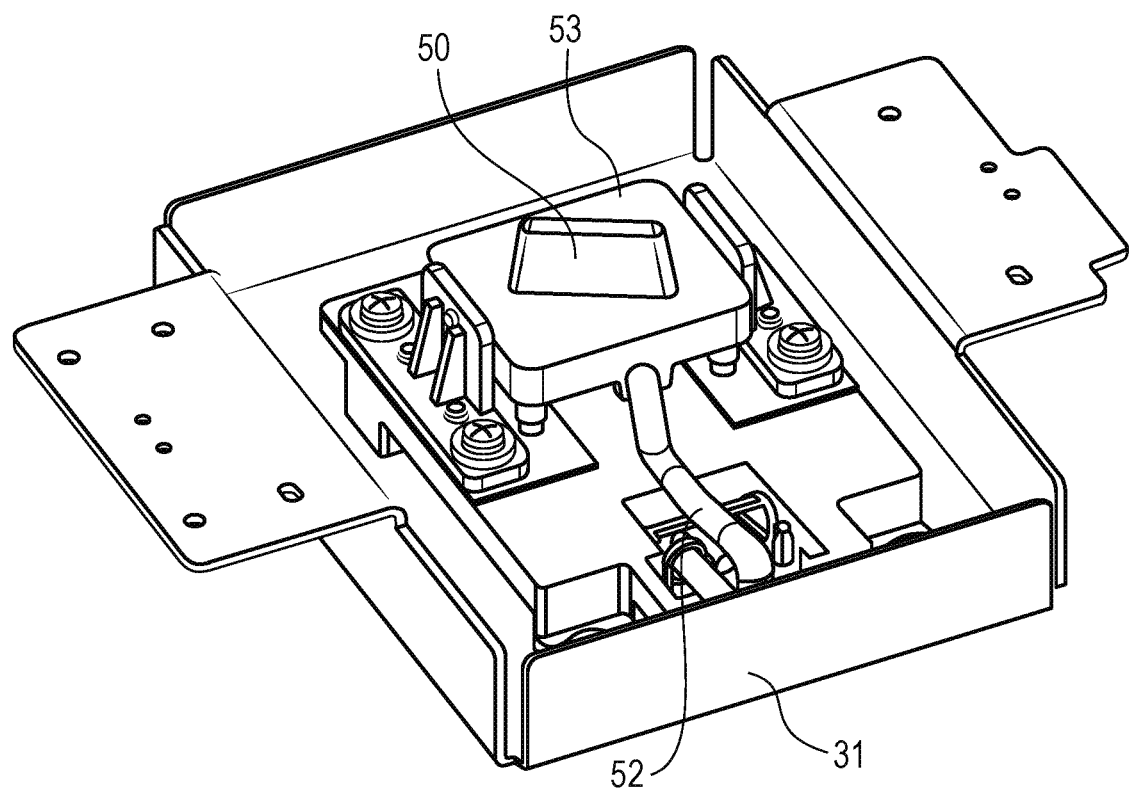
FIG. 4 is a perspective view illustrating an example of a cleaning unit.

FIG. 4 is a perspective view illustrating an example of a cleaning unit. As illustrated in FIG. 4, a suction wiper 50 is disposed in the cleaning unit 31. The suction wiper 50 is a mechanism for wiping the ejection orifice surface of the recording head while collectively sucking the first ink and the second ink from the ejection orifice. Therefore, the suction wiper has a width in which a plurality of ejection orifice arrays are entirely covered in a direction intersecting a direction in which the plurality of ejection orifice arrays are arranged in a recording element substrate. The suction wiper 50 is supported by a suction holder 53. The suction holder 53 is urged in a direction perpendicular to the ejection orifice surface of the recording head. A tube 52 is connected to the suction wiper 50 through the suction holder 53. A decompression unit such as a suction pump and the like is connected to the tube 52. By operating the decompression unit, the pressure in the suction wiper 50 can be reduced.

Figure 6:
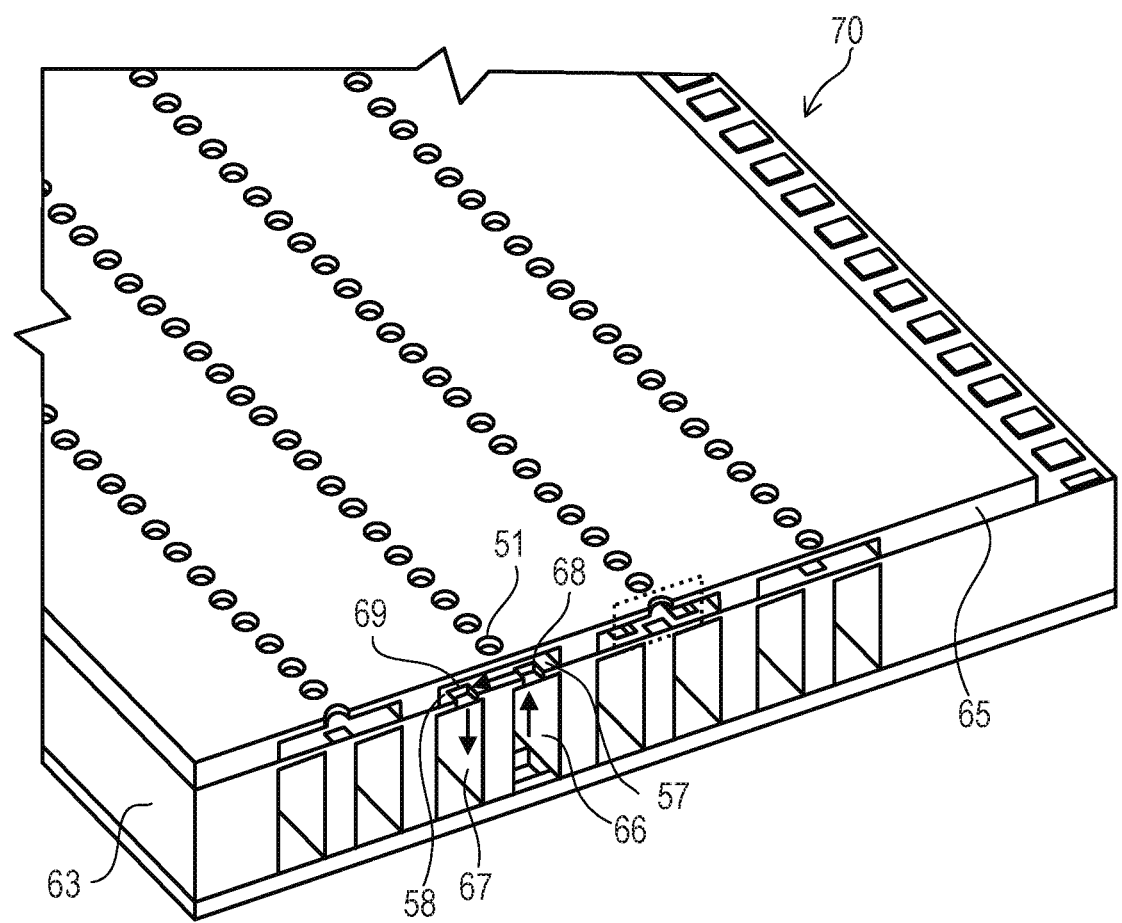
FIG. 6 is a perspective view illustrating a cross section of a recording element substrate.

FIG. 6 is a perspective view illustrating a cross section of a recording element substrate. As illustrated in FIG. 6, a recording element substrate 70 includes an ejection orifice formation member 65 in which ejection orifice 51 are formed and a substrate 63 in which a recording element (not illustrated) is disposed. A surface of the ejection orifice formation member 65 on which the ejection orifice 51 is opened is an "ejection orifice surface". By stacking the ejection orifice formation member 65 and the substrate 63, a first flow path 57 and a second flow path 58 through which ink flows are formed. The first flow path 57 is a region from an inlet 68 through which ink in an inflow path 66 flows into a portion between the ejection orifice 51 and the recording element. In addition, the second flow path 58 is a region from the portion between the ejection orifice 51 and the recording element to an outlet 69 through which ink flows out to an outflow path 67. For example, when a pressure difference is present between the inlet 68 having a high pressure and the outlet 69 having a low pressure, the ink can flow from the higher pressure side to the lower pressure side (to a direction indicated by the arrow in FIG. 6). The ink passing through the inflow path 66 and the inlet 68 enters the first flow path 57. In addition, the ink passing through the portion between the ejection orifice 51 and the recording element flows to the outflow path 67 through the second flow path 58 and the outlet 69.

A flow process of allowing the ink in the first flow path to flow to the second flow path is a process (different process) separated from a process of ejecting the ink from the ejection orifice. That is, in the flow process, the flow of the ink from the first flow path to the second flow path is performed separately from filling of the portion between the ejection orifice and the recording element with ink. The flow process is preferably a process (circulating process) of allowing the ink in the first flow path to flow to the second flow path without discharging the ink from the ejection orifice. A recovery operation such as a preliminary ejection or suction is included in the discharging of the ink from the ejection orifice.

Figure 7:
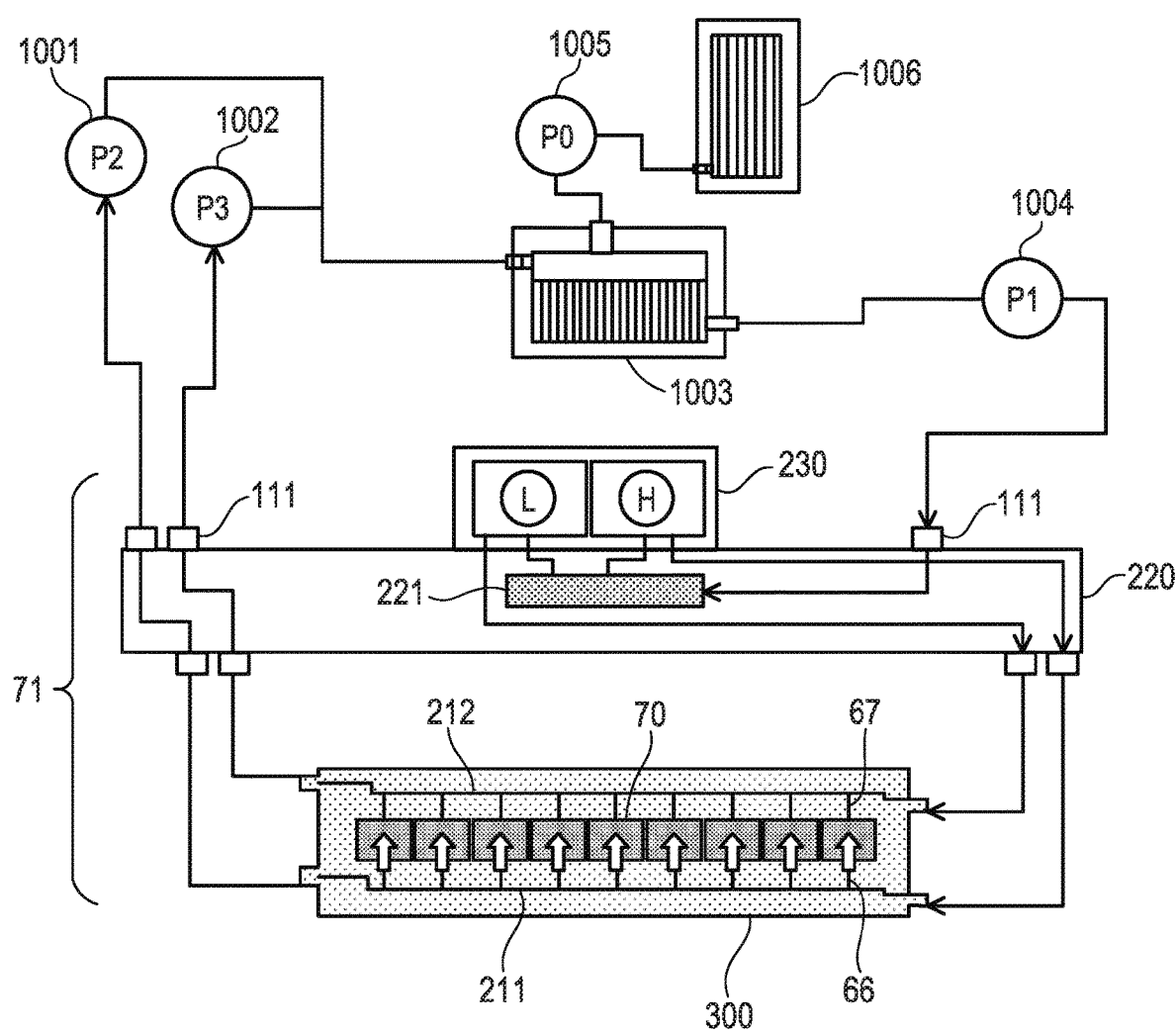
FIG. 7 is a schematic view illustrating an ink supply system.

Next, a method of allowing ink to flow will be described with reference to FIG. 7. FIG. 7 is a schematic view illustrating an ink supply system. A line head 71 illustrated in FIG. 7 is connected to a first circulation pump (high pressure side) 1001, a first circulation pump (low pressure side) 1002, a buffer tank 1003 and a second circulation pump 1004. In FIG. 7, in order to simplify the description, only a path through which ink of one color flows is illustrated. However, actually, flow paths for four colors of CMYK are provided in the line head 71.

The buffer tank 1003 connected to a main tank 1006 which is an ink storage portion includes an atmosphere communication opening (not illustrated) and can discharge foam in the ink to outside. The buffer tank 1003 is connected to a replenishing pump 1005. The ink is consumed by the line head 71 by ejecting (discharging) the ink from the ejection orifice, such as recording of the image or suction recovery. The replenishing pump 1005 supplies the amount of ink corresponding to the consumption amount from the main tank 1006 to the buffer tank 1003.

The first circulation pump (high pressure side) 1001 and the first circulation pump (low pressure side) 1002 make the ink in the line head 71 flowing out from a liquid connection unit 111 flow to the buffer tank 1003. As the first circulation pump, a displacement pump having quantitative liquid feeding ability is preferably used. Specific examples of the displacement pump may include a tube pump, a gear pump, a diaphragm pump and a syringe pump. When an ejection unit 300 is driven, the ink can flow in a common inflow path 211 and a common outflow path 212 by the first circulation pump (high pressure side) 1001 and the first circulation pump (low pressure side) 1002.

A negative pressure control unit 230 includes two pressure adjustment mechanisms having different control pressures. The pressure adjustment mechanism (high pressure side) H and the pressure adjustment mechanism (low pressure side) L are connected to the common inflow path 211 and the common outflow path 212 in the ejection unit 300, respectively, through a supply unit 220 provided with a filter 221 for removing foreign matters from ink. The ejection unit 300 is provided with the inflow path 66 and outflow path 67 allowing the common inflow path 211, the common outflow path 212 and the recording element substrate 70 to communicate with each other. Since the inflow path 66 and the outflow path 67 communicate with the common inflow path 211 and the common outflow path 212, flow (indicated by the arrow in FIG. 7) in which a part of the ink passes through an internal flow path of the recording element substrate 70 from the common inflow path 211 to the common outflow path 212 is generated. The flow of the ink in the internal flow path of the recording element substrate 70 is illustrated by the arrow of FIG. 6. That is, as illustrated in FIG. 6, the ink in the first flow path 57 flows to the second flow path 58 through the portion between the ejection orifice 51 and the recording element.

As illustrated in FIG. 7, since the pressure adjustment mechanism H is connected to the common inflow path 211 and the pressure adjustment mechanism L is connected to the common outflow path 212, a pressure difference between the inflow path 66 and the outflow path 67 is generated. Therefore, a pressure difference is also generated between the inlet 68 communicating with the inflow path 66 (FIG. 6) and the outlet 69 communicating with the outflow path 67 (FIG. 6).

The recording head preferably includes a mechanism for heating the ink in the recording head. When the ink is heated in the recording head, a viscosity of the ink is decreased. Therefore, since the ink in the flow path of the recording head is more efficiently circulated, the occurrence of the image unevenness can be more suppressed. For example, the ink may be heated to a temperature higher than a recording environment temperature such as room temperature. An example of a unit heating the ink in the recording head may include an ink temperature adjustment heater disposed to be in contact with the recording head or an ink ejection heater. In order to heat the ink by the ink ejection heater, for example, a current enough not to eject the ink may be repeatedly applied. It is preferable that the ink is heated so that the temperature of the ink in the recording head is 30° C. or higher to 60° C. or lower.

(Aqueous Ink)

The ink used in the ink jet recording method of the present invention is aqueous ink for ink jet containing a pigment as a coloring material. Hereinafter, respective components used in the ink will be described in detail.

[Pigment]

A coloring material contained in the ink is a pigment. A content (% by mass) of the pigment in the ink is preferably 0.5% by mass or more to 15.0% by mass or less and more preferably 1.0% by mass or more to 10.0% by mass or less based on the total mass of the ink.

Specific examples of the pigment may include inorganic pigments such as carbon black and titanium oxide; and organic pigments such as azo, phthalocyanine, quinacridone, isoindolinone, imidazolone, diketopyrrolopyrrole, dioxazine and perinone.

From the viewpoint of a method of dispersing a pigment, a resin-dispersed pigment using a resin as a dispersant or a self-dispersible pigment in which a hydrophilic group is bonded to a particle surface of a pigment can be used as a pigment. In addition, a resin-bonded pigment in which an organic group including a resin is chemically bonded to a particle surface of a pigment or a microcapsule pigment in which a particle surface of a pigment is covered with a resin can be used.

As the resin dispersant for dispersing the pigment in an aqueous medium, it is preferable to use a resin dispersant capable of dispersing a pigment in an aqueous medium by an action of an anionic group. As the resin dispersant, resins to be described later, and among them, a water-soluble resin can be used. A content (% by mass) of the pigment in the ink is preferably 0.3 times or more to 10.0 times or less relative to a content (% by mass) of the resin dispersant in terms of a mass ratio.

A self-dispersible pigment in which an anionic group such as a carboxylic acid group, a sulfonic acid group or a phosphonic acid group is bonded to a particle surface of a pigment directly or through another atomic group (—R—) can be used. The anionic group may be any of an acid-type and a salt-type. In a case where the anionic group is a salt-type, a part or whole of the anionic group may be dissociated. In a case where the anionic group is a salt-type, examples of a cation serving as a counter ion may include an alkali metal cation, ammonium and organic ammonium. Specific examples of another atomic group (—R—) may include a straight chain or branched alkylene group having 1 to 12 carbon atoms; an arylene group such as a phenylene group or a naphthylene group; a carbonyl group; an imino group; an amide group; a sulfonyl group; an ester group; and an ether group. In addition, a group obtained by combining those groups may be used.

[Resin]

A resin can be contained in ink A content (% by mass) of the resin in the ink is preferably 0.1% by mass or more to 20.0% by mass or less and more preferably 0.5% by mass or more to 15.0% by mass or less based on the total mass of the ink.

The resin can be added to the ink as a resin dispersant or its assistance, that is, (i) in order to stabilize a dispersion state of the pigment. In addition, a resin can be added to the ink (ii) in order to improve various properties of the recorded image. Examples of a form of the resin may include a block copolymer, a random copolymer, a graft copolymer and combinations thereof. In addition, the resin may be a water-soluble resin dissolved in an aqueous medium and may be a resin particle dispersed in an aqueous medium. The resin particle does not need to contain a coloring material.

In the present specification, the expression "a resin is water-soluble" means that when the resin is neutralized with alkali equivalent to an acid value, the resin is present in an aqueous medium in a state where a particle of which diameter can be measured by a dynamic light scattering method is not formed. It can be determined whether or not the resin is water-soluble by the following method. First, a liquid (resin solid content: 10% by mass), which contains the resin neutralized with the alkali (sodium hydroxide, potassium hydroxide or the like) equivalent to the acid value, is prepared. Next, the prepared liquid is diluted with pure water by 10 times (volume basis) to prepare a sample solution. When the particle diameter of the resin in the sample solution is measured by the dynamic light scattering method or when a particle having a particle diameter is not measured, it can be determined that the resin is water-soluble. The measurement conditions can be set as follows.

[Measurement Condition]
SetZero: 30 seconds
Number of measurements: 3 times
Measurement time: 180 seconds As a particle size distribution analyzer, a particle size analyzer (for example, trade name "UPA-EX150" manufactured by Nikkiso Co., Ltd.) or the like by the dynamic light scattering method can be used. It goes without saying that the particle size distribution analyzer to be used, the measurement conditions and the like are not limited thereto.

The acid value of the water-soluble resin is preferably 100 mg KOH/g or more to 250 mg KOH/g or less. The acid value of the resin constituting the resin particle is preferably 5 mg KOH/g or more to 100 mg KOH/g or less. A weight average molecular weight of the water-soluble resin is preferably 3,000 or more to 15,000 or less. A weight average molecular weight of the resin constituting the resin particle is preferably 1,000 or more to 2,000,000 or less. A volume average particle diameter of the resin particle measured by the dynamic light scattering method is preferably 50 nm or more to 500 nm or less.

Examples of the resin may include an acrylic resin, a urethane-based resin and an olefin-based resin. Among them, an acrylic resin and a urethane-based resin are preferable, and an acrylic resin constituted by a unit derived from (meth)acrylic acid or (meth)acrylate is further preferable.

As the acrylic resin, a resin having a hydrophilic unit and a hydrophobic unit as a constitution unit is preferable.

The hydrophilic unit is a unit having a hydrophilic group such as an anionic group. For example, the hydrophilic unit can be formed by polymerizing a hydrophilic monomer having a hydrophilic group. Specific examples of the hydrophilic monomer having a hydrophilic group may include acid monomers having a carboxylic acid group such as (meth)acrylic acid, itaconic acid, maleic acid and fumaric acid, and anionic monomers such as anhydrides and salts of these acid monomers. Examples of the cation constituting the salt of the acid monomer may include ions such as lithium, sodium, potassium, ammonium and organic ammonium. The hydrophobic unit is a unit having no hydrophilic group such as an anionic group. For example, the hydrophobic unit can be formed by polymerizing a hydrophobic monomer having no hydrophilic group such as an anionic group. Specific examples of the hydrophobic monomer may include monomers having an aromatic ring such as styrene, α-methylstyrene and benzyl (meth)acrylate; and (meth)acrylic acid ester monomers such as methyl (meth)acrylate, butyl (meth)acrylate and 2-ethylhexyl (meth)acrylate.

Among them, an acrylic resin having a hydrophilic unit derived from (meth)acrylic acid and a hydrophobic unit derived from at least one of a monomer having an aromatic ring and a (meth)acrylic acid ester monomer is preferable. In particular, an acrylic resin having a hydrophilic unit derived from (meth)acrylic acid and a hydrophobic unit derived from at least one monomer of styrene and α-methylstyrene is preferable. Since these acrylic resins easily interact with the pigment, the acrylic resins can be suitably used as a resin dispersant for dispersing the pigment.

The urethane-based resin can be obtained, for example, by reacting polyisocyanate with polyol. In addition, the urethane-based resin can be obtained by the additional reaction of a chain extender. Examples of the olefin-based resin may include polyethylene and polypropylene.

[Aqueous Medium]

The ink used in the ink jet recording method of the present invention is aqueous ink containing water as an aqueous medium. The ink can contain water or an aqueous medium which is a mixed solvent of water and a water-soluble organic solvent. It is preferable to use deionized water or ion-exchanged water as the water. A content (% by mass) of the water in the aqueous ink is preferably 50.0% by mass or more to 95.0% by mass or less based on the total mass of the ink. In addition, the content (% by mass) of the water-soluble organic solvent in the aqueous ink is preferably 3.0% by mass or more to 50.0% by mass or less based on the total mass of the ink.

Examples of the water-soluble organic solvent may include monohydric alcohols having 1 to 4 carbon atoms, such as methyl alcohol (33.1), ethyl alcohol (23.8), n-propyl alcohol, isopropyl alcohol (18.3), n-butyl alcohol, sec-butyl alcohol and tert-butyl alcohol; dihydric alcohols such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol and 3-methyl-1,5-pentanediol (23.9); polyhydric alcohols such as 1,2,6-hexanetriol (28.5), glycerin (42.3), trimethylolpropane (33.7) and trimethylolethane; alkylene glycols such as ethylene glycol (40.4), diethylene glycol (31.7), triethylene glycol (22.7), tetraethylene glycol, butylene glycol, hexylene glycol and thiodiglycol; glycol ethers such as diethylene glycol monomethyl ether, diethylene glycol monoethyl ether, triethylene glycol monoethyl ether and triethylene glycol monobutyl ether (9.8); polyalkylene glycols having a number average molecular weight of 200 to 1,000 such as polyethylene glycol (11.5) having a number average molecular weight of 600, polyethylene glycol (4.6) having a number average molecular weight of 1,000 and polypropylene glycol; nitrogen-containing compounds such as 2-pyrrolidone (28.8), N-methyl-2-pyrrolidone (32.0), 1,3-dimethyl-2-imidazolidinone, N-methylmorpholine, urea (110.3), ethylene urea (49.7) and triethanolamine (31.9); and sulfur-containing compounds such as dimethyl sulfoxide (48.9) and bis(2-hydroxyethyl sulfone). The numerical values in the parentheses attached to the water-soluble organic solvents are dielectric constants of the water-soluble organic solvents at 25° C. A water-soluble organic solvent having a vapor pressure lower than that of water at 25° C. is preferable.

The dielectric constants of the water and the water-soluble organic solvent can be measured by using a dielectric constant meter (for example, trade name "BI-870", manufactured by BROOKHAVEN INSTRUMENTS CORPORATION) at a frequency of 10 kHz. The dielectric constant of the water-soluble organic solvent that is solid at 25° C. is a value calculated from the following Equation (1) by measuring a dielectric constant of a 50% by mass aqueous solution. The general "water-soluble organic solvent" refers to a liquid; however, in the present invention, a water-soluble organic solvent that is solid at 25° C. (room temperature) is also included.

$$\varepsilon_{sol} = 2\varepsilon_{50\%} - \varepsilon_{water} \quad (1)$$

$\varepsilon_{sol}$: dielectric constant of water-soluble organic solvent being solid at 25° C.

$\varepsilon_{50\%}$: dielectric constant of 50% by mass aqueous solution of water-soluble organic solvent being solid at 25° C.

$\varepsilon_{water}$: dielectric constant of water

Examples of a water-soluble organic solvent that is commonly used in an aqueous ink and solid at 25° C. may include 1,6-hexanediol, trimethylolpropane, ethylene urea, urea and polyethylene glycol having a number average molecular weight of 1,000. Here, the reason why the dielectric constant of the water-soluble organic solvent that is solid at 25° C. is calculated from the dielectric constant of the 50% by mass aqueous solution is as follows. Some of the water-soluble organic solvents that are solid at 25° C. and usable as a component of an aqueous ink are difficult to be used to prepare an aqueous solution having a high concentration of more than 50% by mass. On the other hand, dielectric constant of an aqueous solution having a low concentration of 10% by mass or less is dominated by the dielectric constant of water. Therefore, it is difficult to obtain the probable (effective) dielectric constant value of the water-soluble organic solvent. Therefore, the inventors of the present invention conducted studies, and as a result, it was found that most of the water-soluble organic solvents that are solid at 25° C. and usable in ink can be used to prepare an aqueous solution to be measured and the calculated dielectric constants conform to the effects of the present invention. For these reasons, a 50% by mass aqueous solution is used. Regarding a water-soluble organic solvent that is solid at 25° C. and difficult to be used to prepare the 50% by mass aqueous solution due to a low solubility in water, an aqueous solution having a saturated concentration is used, and the dielectric constant value calculated according to the above-mentioned case of calculating $\varepsilon_{sol}$ is conveniently used.

The ink preferably contains a water-soluble organic solvent having a dielectric constant of 40.0 or more. By using the ink containing a water-soluble organic solvent having a dielectric constant of 40.0 or more, the aggregation of the pigment can be alleviated, the sticking recovery property can be further improved, and the occurrence of the image unevenness can be further suppressed. The upper limit of the dielectric constant is not particularly limited, and is preferably 120.0 or less, for example. Among the water-soluble organic solvents having a dielectric constant of 40.0 or more, glycerin is particularly preferable. A content (% by mass) of a water-soluble organic solvent having a dielectric constant of 40.0 or more in an aqueous ink is preferably 1.0% by mass or more to 20.0% by mass or less based on the total mass of the ink.

[Other Additives]

The ink may contain various additives such as an anti-foaming agent, a surfactant, a pH adjuster, a viscosity modifier, a rust preventive, a preservative, a mildew-proofing agent, an antioxidant and an anti-reducing agent, as necessary, in addition to the above-mentioned components.

[Physical Property of Ink]

A dynamic surface tension of ink at a lifetime of 10 milliseconds is preferably 48 mN/m or less. In a case where ink having a dynamic surface tension of 48 mN/m or less is used, since wettability in the flow path is improved, the ink can be further efficiently circulated in the flow path and the occurrence of the image unevenness can be further suppressed. A dynamic surface tension of ink at a lifetime of 10 milliseconds is preferably 35 mN/m or more and more preferably 37 mN/m or more. The dynamic surface tension of ink can be adjusted by, for example, the type and content of a surfactant or a water-soluble organic solvent. The dynamic surface tension is a surface tension of a liquid in a moving state. Therefore, for adjusting the dynamic surface tension of ink, it is preferable to use a component capable of controlling a surface tension even in a moving state.

The dynamic surface tension used to specify the properties of ink is a dynamic surface tension at a lifetime of 10 milliseconds determined by a maximum bubble pressure method. The maximum bubble pressure method is a method in which the maximum pressure required to release bubble formed at the tip of a probe (capillary tube) immersed in a liquid to be measured is measured and the surface tension of the liquid is calculated from the maximum pressure. The maximum pressure is measured while bubble is continuously formed at the tip of the probe. The time from when a surface of a new bubble is formed at the tip of the probe to when the maximum bubble pressure (the point of time when the radius of curvature of the bubble is equal to a radius of the tip portion of the probe) is reached is referred to as a "lifetime".

EXAMPLES

Hereinafter, the present invention will be described in more detail by way of examples, comparative examples, and reference examples. The present invention is not limited to the following examples as long as it is within the scope of the present invention. With respect to the amount of component, "part(s)" and "%" are on a mass basis, unless otherwise specified.

<Preparation of Pigment Dispersion Liquid>
(Pigment Dispersion Liquid 1)

A water-soluble resin was neutralized with a 10% aqueous potassium hydroxide solution of 1 neutralization equivalent and dissolved in ion-exchanged water, thereby preparing an aqueous solution of a resin dispersant (a content of a resin was 10.0%). As the water-soluble resin, a styrene/acrylic acid copolymer (acid value of 160 mg KOH/g, weight average molecular weight of 10,000) was used. 10.0 parts of carbon black (specific surface area of 210 $m^2$/g, dibutyl phthalate (DBP) oil absorption of 74 mL/100 g), 50.0 parts of an aqueous solution of a resin dispersant, and 40.0 parts of water were mixed to obtain a mixture. The mixture obtained using a sand grinder was dispersed for 1 hour and then subjected to centrifugal separation to remove coarse particles. The mixture was subjected to pressure filtration with a microfilter (manufactured by FUJIFILM Corporation) having a pore size of 3.0 μm and then an appropriate amount of ion-exchanged water was added to the mixture, thereby obtaining a pigment dispersion liquid 1. The content of the pigment in the resulting pigment dispersion liquid 1 was 15.0% and the content of the resin dispersant was 3.0%.

(Pigment Dispersion Liquid 2)

A pigment dispersion liquid 2 was obtained by the same procedure as that of the case of the pigment dispersion liquid 1 described above except that the pigment was changed to C.I. Pigment Blue 15:3. The content of the pigment in the resulting pigment dispersion liquid 2 was 15.0% and the content of the resin dispersant was 3.0%.

(Pigment Dispersion Liquid 3)

A pigment dispersion liquid 3 was obtained by the same procedure as that of the case of the pigment dispersion liquid 1 described above except that the pigment was changed to C.I. Pigment Red 122. The content of the pigment in the resulting pigment dispersion liquid 3 was 15.0% and the content of the resin dispersant was 3.0%.

(Pigment Dispersion Liquid 4)

A pigment dispersion liquid 4 was obtained by the same procedure as that of the case of the pigment dispersion liquid 1 described above except that the pigment was changed to C.I. Pigment Yellow 74. The content of the pigment in the resulting pigment dispersion liquid 4 was 15.0% and the content of the resin dispersant was 3.0%.

(Pigment Dispersion Liquid 5)

A solution prepared by dissolving 5.0 g of concentrated hydrochloric acid in 5.5 g of water was cooled to 5° C. and 1.6 g of 4-amino-1-benzene carboxylic acid was added to the solution. A container containing this solution was placed in an ice bath and the solution was stirred while keeping the temperature of the solution at 10° C. or lower, and a solution prepared by dissolving 1.8 g of sodium nitrite in 9.0 g of water of 5° C. was added to the solution. After stirring for 15 minutes, 6.0 g of carbon black was added under stirring, and then stirring was performed for additional 15 minutes to obtain slurry. The resulting slurry was filtered with a filter paper (trade name "Standard Filter Paper No. 2", manufactured by Advantec Co., Ltd.), the particles were sufficiently washed with water and dried in an oven at 110° C., thereby preparing a self-dispersible pigment in which a —$C_6H_3$—(COONa)$_2$ group is bonded to a particle surface of a pigment. A pigment dispersion liquid 5 was obtained by adding an appropriate amount of water to the resulting self-dispersible pigment. A content of the pigment in the resulting pigment dispersion liquid 5 was 15.0%.

(Pigment Dispersion Liquid 6)

20.0 g of carbon black, 11.6 mmol of a treatment agent, 20.0 mmol of nitric acid, and 100.0 mL of water were mixed. As the treatment agent, ((4-aminobenzoylamino)-methane-1,1-diyl)bisphosphonic acid sodium salt was used. Mixing was performed with a Silverson mixer at 25° C. and 6,000 rpm for 30 minutes to obtain a mixture. A solution prepared by dissolving 20.0 mmol of sodium nitrite in a small amount was gradually added to the resulting mixture. By adding an aqueous solution, the temperature of the mixture reached 60° C. After the reaction is performed at 60° C. for 1 hour, 1.0 mol/L of an aqueous potassium hydroxide solution was added to the mixture to adjust a pH of the mixture to 10. After 30 minutes, 20.0 mL of water was added to the mixture and a removal of a low molecular compound and desalting were performed using a spectrum membrane. The resulting mixture was diluted with water, thereby obtaining a pigment dispersion liquid 6 (a content of a pigment was 15.0%) containing self-dispersible pigment. The self-dispersible pigment in which a —$C_6H_4$—CONH—CH($PO_3K_2$)$_2$ group was bonded to a particle surface was contained in the pigment dispersion liquid 6.

(Pigment Dispersion Liquid 7)

A self-dispersible pigment (trade name "Cab-O-Jet300", manufactured by Cabot Corporation) in which a benzene carboxylic acid group is bonded to a particle surface of carbon black was diluted with water and stirring was sufficiently performed, thereby obtaining a pigment dispersion liquid 7 (a content of a pigment was 15.0%).

(Pigment Dispersion Liquid 8)

With reference to the description of Example 3 in Japanese Patent Application Laid-Open No. 2003-535949, carbon black was oxidized with ozone gas. The carbon black was preliminarily dispersed in ion-exchanged water and then was treated with ozone for 8 hours. Potassium hydroxide was added to the mixture to adjust a pH of the mixture to 7 and then the mixture was dispersed with a liquid-liquid collision type dispersing machine for 3 hours, thereby purifying the mixture by ultrafiltration. After an aqueous potassium hydroxide solution was added to the mixture to adjust a pH of the mixture to 10, an appropriate amount of ion-exchanged water was added to the mixture, thereby obtaining a pigment dispersion liquid 8 (a content of a pigment was 15.0%).

(Pigment Dispersion Liquid 9)

20.0 g of a pigment, 1.6 mmol of a treatment agent, 8.0 mmol of nitric acid, and 200.0 mL of water were mixed. As the pigment, C.I. Pigment Blue 15:3 (trade name "Hostaperm Blue B2G", manufactured by Clariant AG) was used. As the treatment agent, p-aminophthalic acid was used. Mixing was performed with a Silverson mixer at 25° C. and 6,000 rpm for 30 minutes to obtain a mixture. A solution prepared by dissolving 8.0 mmol of potassium nitrite in a small amount was gradually added to the resulting mixture. By adding an aqueous solution, the temperature of the mixture reached 60° C. After the reaction is performed at 60° C. for 1 hour, 1.0 mol/L of an aqueous potassium hydroxide solution was added to the mixture to adjust a pH of the mixture to 10. After 30 minutes, 20.0 mL of water was added to the mixture and a removal of a low molecular compound and desalting were performed using a spectrum membrane. The resulting mixture was diluted with water, thereby obtaining a pigment dispersion liquid 9 (a content of a pigment was 15.0%) containing a self-dispersible pigment. The self-dispersible pigment in which a —$C_6H_3$—$(COOK)_2$ group was bonded to a particle surface was contained in the pigment dispersion liquid 9.

(Pigment Dispersion Liquid 10)

The amount of a treatment agent was 4 mmol and the type of pigment was changed to a solid solution (trade name "Cromophtal Jet Magenta 2BC", manufactured by Ciba Specialty Chemicals Inc.) of C.I. Pigment Red 202 and C.I. Pigment Violet 19. A pigment dispersion liquid 10 (a content of a pigment was 15.0%) was obtained by the same procedure as that of the pigment dispersion liquid 9 described above except for the above conditions. A self-dispersible pigment in which a —$C_6H_3$—$(COOK)_2$ group was bonded to a particle surface was contained in the pigment dispersion liquid 10.

(Pigment Dispersion Liquid 11)

The amount of a treatment agent was 8.0 mmol and the type of pigment was changed to C.I. Pigment Yellow 74 (trade name "Hansa yellow 5GXB", manufactured by Clariant AG). A pigment dispersion liquid 11 (a content of a pigment was 15.0%) was obtained by the same procedure as that of the pigment dispersion liquid 9 described above except for the above conditions. A self-dispersible pigment in which a —$C_6H_3$—$(COOK)_2$ group was bonded to a particle surface was contained in the pigment dispersion liquid 11.

<Preparation of Ink>

Respective components (unit: %) given on the middle part of Table 1 were mixed and sufficiently stirred, and then the mixture was subjected to pressure filtration with a cellulose acetate filter (manufactured by Advantec Co., Ltd.) having a pore size of 3.0 μm. Polyethylene glycol having a number average molecular weight of 1,000 was used. By doing so, black ink (BK), cyan ink (C), magenta ink (M) and yellow ink (Y) were prepared. In Table 1, "Acetylenol E100" represents a trade name of a surfactant manufactured by Kawaken Fine Chemicals Co., Ltd. The lower part of Table 1 shows a dynamic surface tension $\gamma_{10}$ at a lifetime of 10 milliseconds. The dynamic surface tension $\gamma_{10}$ was measured at 25° C. by using a dynamic surface tensiometer (trade name "BUBBLE PRESSURE TENSIOMETER BP-2", manufactured by KRUSS GmbH) by the maximum bubble pressure method.

TABLE 1

Composition and properties of ink

| | Ink | | | | | | | | |
|---|---|---|---|---|---|---|---|---|---|
| | 1 | 2 | 3 | 4 | 5 | 6 | 7 | 8 | 9 |
| Color | BK | C | M | Y | BK | BK | BK | BK | C |
| Pigment dispersion liquid 1 | 40.0 | | | | | | | | |
| Pigment dispersion liquid 2 | | 40.0 | | | | | | | |
| Pigment dispersion liquid 3 | | | 40.0 | | | | | | |
| Pigment dispersion liquid 4 | | | | 40.0 | | | | | |
| Pigment dispersion liquid 5 | | | | | 40.0 | | | | |
| Pigment dispersion liquid 6 | | | | | | 40.0 | | | |
| Pigment dispersion liquid 7 | | | | | | | 40.0 | | |
| Pigment dispersion liquid 8 | | | | | | | | 40.0 | |
| Pigment dispersion liquid 9 | | | | | | | | | 40.0 |
| Pigment dispersion liquid 10 | | | | | | | | | |
| Pigment dispersion liquid 11 | | | | | | | | | |
| C.I. Pigment Blue 199 | | | | | | | | | |
| Glycerin | 15.0 | 15.0 | 15.0 | 15.0 | 15.0 | 15.0 | 15.0 | 15.0 | 15.0 |
| Trimethylolpropane | 10.0 | 10.0 | 10.0 | 10.0 | 10.0 | 10.0 | 10.0 | 10.0 | 10.0 |
| Triethylene glycol | | | | | | | | | |
| 1,2-Hexanediol | 3.0 | 3.0 | 3.0 | 3.0 | 3.0 | 3.0 | 3.0 | 3.0 | 3.0 |
| Polyethylene glycol | | | | | | | | | |
| Acetylenol E100 | 1.0 | 1.0 | 1.0 | 1.0 | 1.0 | 1.0 | 1.0 | 1.0 | 1.0 |
| Water | 31.0 | 31.0 | 31.0 | 31.0 | 31.0 | 31.0 | 31.0 | 31.0 | 31.0 |
| Dynamic surface tension $\gamma_{10}$ (mN/m) | 38 | 38 | 38 | 38 | 37 | 37 | 37 | 37 | 37 |

| | Ink | | | | | | |
|---|---|---|---|---|---|---|---|
| | 10 | 11 | 12 | 13 | 14 | 15 | 16 | 17 |
| Color | M | Y | BK | BK | BK | BK | BK | C |
| Pigment dispersion liquid 1 | | | | | 40.0 | 40.0 | 40.0 | |
| Pigment dispersion liquid 2 | | | | | | | | |
| Pigment dispersion liquid 3 | | | | | | | | |
| Pigment dispersion liquid 4 | | | | | | | | |
| Pigment dispersion liquid 5 | | | | | | | | |
| Pigment dispersion liquid 6 | | | 40.0 | 40.0 | | | | |
| Pigment dispersion liquid 7 | | | | | | | | |
| Pigment dispersion liquid 8 | | | | | | | | |
| Pigment dispersion liquid 9 | | | | | | | | |

TABLE 1-continued

| Composition and properties of ink | | | | | | | | |
|---|---|---|---|---|---|---|---|---|
| Pigment dispersion liquid 10 | 40.0 | | | | | | | |
| Pigment dispersion liquid 11 | | 40.0 | | | | | | |
| C.I. Pigment Blue 199 | | | | | | | | 3.5 |
| Glycerin | 15.0 | 15.0 | 15.0 | 15.0 | 15.0 | 15.0 | | 15.0 |
| Trimethylolpropane | 10.0 | 10.0 | | | 10.0 | 10.0 | 25.0 | 10.0 |
| Triethylene glycol | | | 10.0 | | | | | |
| 1,2-Hexanediol | 3.0 | 3.0 | 3.0 | 3.0 | 0.5 | | 3.0 | 3.0 |
| Polyethylene glycol | | | | 10.0 | | | | |
| Acetylenol E100 | 1.0 | 1.0 | 1.0 | 1.0 | | | 1.0 | 1.0 |
| Water | 31.0 | 31.0 | 31.0 | 31.0 | 34.5 | 35.0 | 31.0 | 67.5 |
| Dynamic surface tension $\gamma_{10}$ (mN/m) | 37 | 37 | 37 | 37 | 48 | 49 | 37 | 38 |

<Preparation of Ink Set>

As shown in Table 2, ink sets of a combination of ink were prepared.

TABLE 2

| Configuration of ink set | | | |
|---|---|---|---|
| | Ink set | | |
| | 1 | 2 | 3 |
| First ink | 5 | 1 | 5 |
| Second ink | 2 | 2 | 9 |

<Configuration of Recording Head>

A recording head of a type in which thermal energy is applied to eject ink was prepared. As illustrated in FIG. 2, the recording head 20 is a line head in which the plurality of recording element substrates 27 are arranged in line with each other so that ends of the adjacent recording element substrates 27 overlap each other in an arrangement direction of the ejection orifice to form a joint portion. In the recording element substrate 27, four rows of the ejection orifice arrays 25 configured by arranging 512 ejection orifices are arranged at an array density of 600 dpi. The recording head 20 further includes the first flow path 57 and the second flow path 58 as illustrated in FIGS. 5 and 6. In addition, the suction wiper has a width in which the ejection orifice arrays of ink are entirely covered in a direction intersecting a direction in which the plurality of ejection orifice arrays are arranged in the recording element substrate. The ejection orifice arrays other than the ejection orifice arrays used for the evaluation were sealed with a resin. The mass of ink droplets ejected from one ejection orifice is 5.0 ng.

<Recovery Mechanism>

Suction wiper (FIG. 4)

Suction cap (no wiping)

<Evaluation (1)>

(Ink Jet Recording Apparatus)

The ink jet recording apparatus prepared according to the evaluation conditions shown in Table 3 was used. The recording apparatus includes an ink supply system as illustrated in FIG. 7 and a mechanism for circulating (flowing) ink in the recording head including the first flow path and the second flow path as illustrated in FIGS. 5 and 6. In the present examples, a recording duty is defined as 100% when an image is recorded under the condition in which three ink droplets of 5.0 ng are applied to a unit region of 1/600 inch×1/600 inch. The conveyance speed of the recording medium was 15 inch/sec. In the evaluation criteria shown below, "A" and "B" mean an acceptable level and "C" means an unacceptable level.

(Sticking Recovery Property)

The prepared ink jet recording apparatus was used. The ink storage portion was filled with the prepared ink, and the ink was fed to the recording head using the pump. The recording head that was not capped was left at 30° C. and 10% relative humidity for 120 hours, and then the recovery operation was performed while allowing the ink to flow according to the evaluation conditions shown in Table 3. At this time, the flow rate of the ink was adjusted by the pump and the ink temperature adjustment heater disposed so as to be in contact with the recording head was used, such that the ink was heated to 40° C. Thereafter, a solid image having a recording duty of 50% was recorded on a recording medium (plain paper) of A4 size using the entire ejection orifices to evaluate the sticking recovery property according to the evaluation criteria shown below. As the recording medium, a paper (trade name "high grade exclusive paper HR-101S" (manufactured by Cannon INC.)) was used. The evaluation results are shown in Table 3.

A: There was no non-ejecting ejection orifice (dot missing).

C: The non-ejecting ejection orifices (dot missing) were present at less than 10% of all the ejection orifices.

D: The non-ejecting ejection orifices (dot missing) were present at 10% or more of all the ejection orifices.

(Image Unevenness)

The prepared ink jet recording apparatus was used. The ink storage portion was filled with the prepared ink, and the ink was fed to the recording head using the pump. The recording head that was not capped was left at 30° C. and 10% relative humidity for 120 hours, and then the recovery operation was performed while allowing the ink to flow according to the evaluation conditions shown in Table 3. Thereafter, a solid image having a recording duty of 50% was recorded on a recording medium (plain paper) of A4 size using the entire ejection orifices to evaluate the image unevenness according to the evaluation criteria shown below. As the recording medium, a paper (trade name "high grade exclusive paper HR-101S" (manufactured by Cannon INC.)) was used. The evaluation results are shown in Table 3.

A: There was no unevenness on any portion of the solid image.

B: Unevenness was generated in the area of the ejection beginning portion (leading end of recording medium) on which 10 dots or less were formed.

C: Unevenness was generated in the area of the ejection beginning portion (leading end of recording medium) on which more than 10 dots and 50 dots or less were formed.

D: Unevenness was generated in the area of the ejection beginning portion (leading end of recording medium) on which more than 50 dots and 100 dots or less were formed.

TABLE 3

Evaluation condition and evaluation result (1)

| | | | Evaluation condition | | | | | Evaluation result | |
|---|---|---|---|---|---|---|---|---|---|
| | | | | Flow of ink | | | | Sticking | |
| | | Ink | Recovery mechanism | Before wiping | Simultaneous with wiping | After wiping | Flow rate of ink (m/s) | Heating of ink | recovery property | Image unevenness |
| Example | 1 | 1 | Suction wiper | | ○ | | 5.0 | Performed | A | A |
| | 2 | 2 | Suction wiper | | ○ | | 5.0 | Performed | A | A |
| | 3 | 3 | Suction wiper | | ○ | | 5.0 | Performed | A | A |
| | 4 | 4 | Suction wiper | | ○ | | 5.0 | Performed | A | A |
| | 5 | 5 | Suction wiper | | ○ | | 5.0 | Performed | A | A |
| | 6 | 6 | Suction wiper | | ○ | | 5.0 | Performed | A | A |
| | 7 | 7 | Suction wiper | | ○ | | 5.0 | Performed | A | A |
| | 8 | 8 | Suction wiper | | ○ | | 5.0 | Performed | A | A |
| | 9 | 9 | Suction wiper | | ○ | | 5.0 | Performed | A | A |
| | 10 | 10 | Suction wiper | | ○ | | 5.0 | Performed | A | A |
| | 11 | 11 | Suction wiper | | ○ | | 5.0 | Performed | A | A |
| | 12 | 12 | Suction wiper | | ○ | | 5.0 | Performed | A | A |
| | 13 | 13 | Suction wiper | | ○ | | 5.0 | Performed | A | A |
| | 14 | 1 | Suction wiper | | ○ | | 0.5 | Performed | A | B |
| | 15 | 1 | Suction wiper | | ○ | | 1.0 | Performed | A | A |
| | 16 | 1 | Suction wiper | | ○ | | 10.0 | Performed | A | A |
| | 17 | 1 | Suction wiper | | | ○ | 0.5 | Performed | A | B |
| | 18 | 1 | Suction wiper | | | ○ | 1.0 | Performed | A | A |
| | 19 | 1 | Suction wiper | | | ○ | 10.0 | Performed | A | A |
| | 20 | 1 | Suction wiper | | ○ | | 5.0 | Not performed | A | B |
| | 21 | 1 | Suction wiper | | | ○ | 5.0 | Not performed | A | B |
| | 22 | 14 | Suction wiper | | ○ | | 5.0 | Performed | A | A |
| | 23 | 15 | Suction wiper | | ○ | | 5.0 | Performed | A | B |
| | 24 | 14 | Suction wiper | | | ○ | 5.0 | Performed | A | A |
| | 25 | 15 | Suction wiper | | | ○ | 5.0 | Performed | A | B |
| | 26 | 16 | Suction wiper | | ○ | | 5.0 | Performed | A | B |
| | 27 | 1 | Suction wiper | | | ○ | 5.0 | Performed | A | A |
| | 28 | 1 | Suction wiper | | ○ | ○ | 5.0 | Performed | A | A |
| | 29 | 1 | Suction wiper | ○ | ○ | | 5.0 | Performed | A | A |
| | 30 | 1 | Suction wiper | ○ | | ○ | 5.0 | Performed | A | A |
| | 31 | 1 | Suction wiper | ○ | ○ | ○ | 5.0 | Performed | A | A |
| | 32 | 5 | Suction wiper | | | ○ | 5.0 | Performed | A | B |
| | 33 | 5 | Suction wiper | | ○ | ○ | 5.0 | Performed | A | A |
| | 34 | 5 | Suction wiper | ○ | ○ | | 5.0 | Performed | A | A |
| | 35 | 5 | Suction wiper | ○ | | ○ | 5.0 | Performed | A | B |
| | 36 | 5 | Suction wiper | ○ | ○ | ○ | 5.0 | Performed | A | A |
| Comparative Example | 1 | 1 | None | | | | — | Performed | D | — |
| | 2 | 1 | None | ○ | ○ | ○ | 5.0 | Performed | D | — |
| | 3 | 1 | Suction cap | ○ | ○ | ○ | 5.0 | Performed | C | — |
| | 4 | 1 | Suction wiper | | | | — | Performed | A | C |
| | 5 | 1 | Suction wiper | ○ | | | — | Performed | A | C |
| Reference Example | 1 | 17 | Suction wiper | | ○ | | 5.0 | Performed | A | — |
| | 2 | 17 | Suction wiper | | | ○ | 5.0 | Performed | A | — |
| | 3 | 17 | None | | | | — | Performed | A | — |
| | 4 | 17 | Suction cap | ○ | ○ | ○ | 5.0 | Performed | A | — |

<Evaluation (2)>
(Ink Jet Recording Apparatus)

The ink jet recording apparatus prepared according to the evaluation conditions shown in Table 4 was used. The recording apparatus includes an ink supply system as illustrated in FIG. 7 and a mechanism for circulating (flowing) ink in the supply system including the first flow path and the second flow path as illustrated in FIG. 5. In the present examples, a recording duty is defined as 100% when an image is recorded under the condition in which three ink droplets of 5.0 ng are applied to a unit region of 1/600 inch×1/600 inch. The conveyance speed of the recording medium was 15 inch/sec. In the evaluation criteria shown below, "A" and "B" mean an acceptable level and "C" and "D" mean an unacceptable level.

(Sticking Recovery Property)

The prepared ink jet recording apparatus was used. The ink storage portion was filled with each of the prepared ink sets, and the ink sets were fed to the recording head using the pump. The recording head that was not capped was left at 30° C. and 10% relative humidity for 120 hours, and then the recovery operation was performed while allowing the ink to flow according to the evaluation conditions shown in Table 4. At this time, the flow rate of the ink was adjusted by the pump and the ink temperature adjustment heater disposed so as to be in contact with the recording head was used, such that the ink was heated to 40° C. Thereafter, a solid image having a recording duty of 50% was recorded on a recording medium (plain paper) of A4 size using the entire ejection orifices to evaluate the sticking recovery property according to the evaluation criteria shown below. As the recording medium, a paper (trade name "high grade exclusive paper HR-101S" (manufactured by Cannon INC.)) was used. The evaluation results are shown in Table 5.

A: There was no non-ejecting ejection orifice (dot missing).

C: The non-ejecting ejection orifices (dot missing) were present at less than 10% of all the ejection orifices.

D: The non-ejecting ejection orifices (dot missing) were present at 10% or more of all the ejection orifices.

(Image Unevenness)

The prepared ink jet recording apparatus was used. The ink storage portion was filled with each of the prepared ink sets, and the ink sets were fed to the recording head using the pump. The recording head that was not capped was left at 30° C. and 10% relative humidity for 120 hours, and then the recovery operation was performed while allowing the ink to flow according to the evaluation conditions shown in Table 4. Thereafter, a solid image having a recording duty of 50% was recorded on a recording medium (plain paper) of A4 size using the entire ejection orifices to evaluate the image unevenness according to the evaluation criteria shown below. As the recording medium, a paper (trade name "high grade exclusive paper HR-101S" (manufactured by Cannon INC.)) was used. The evaluation results are shown in Table 5.

A: There was no unevenness on any portion of the solid image.

B: Unevenness was generated in the area of the ejection beginning portion (leading end of recording medium) on which 10 dots or less were formed.

C: Unevenness was generated in the area of the ejection beginning portion (leading end of recording medium) on which more than 10 dots and 50 dots or less were formed.

D: Unevenness was generated in the area of the ejection beginning portion (leading end of recording medium) on which more than 50 dots and 100 dots or less were formed.

TABLE 4

| | | Ink set | Suction wiper | Flow of first ink | | Flow of second ink | | Flow rate of ink (m/s) | Heating of ink |
|---|---|---|---|---|---|---|---|---|---|
| | | | | Simultaneous with wiping | After wiping | Simultaneous with wiping | After wiping | | |
| Example | 37 | 1 | Present | ○ | | | ○ | 5.0 | Performed |
| | 38 | 1 | Present | ○ | | ○ | | 5.0 | Performed |
| | 39 | 1 | Present | ○ | | ○ | ○ | 5.0 | Performed |
| | 40 | 1 | Present | ○ | ○ | | ○ | 5.0 | Performed |
| | 41 | 1 | Present | ○ | ○ | ○ | | 5.0 | Performed |
| | 42 | 1 | Present | ○ | ○ | ○ | ○ | 5.0 | Performed |
| | 43 | 1 | Present | | | ○ | ○ | 5.0 | Performed |
| | 44 | 1 | Present | | | ○ | ○ | 5.0 | Performed |
| | 45 | 1 | Present | | ○ | ○ | ○ | 5.0 | Performed |
| Reference Example | 5 | 2 | Present | ○ | | ○ | | 5.0 | Performed |
| | 6 | 3 | Present | ○ | | ○ | | 5.0 | Performed |
| Comparative Example | 6 | 1 | Absent | ○ | | | ○ | 5.0 | Performed |

TABLE 5

| | | Evaluation result (2) | | | |
|---|---|---|---|---|---|
| | | First ink | | Second ink | |
| | | Sticking recovery property | Image unevenness | Sticking recovery property | Image unevenness |
| Example | 37 | A | A | A | A |
| | 38 | A | B | A | A |
| | 39 | A | B | A | A |
| | 40 | A | A | A | A |
| | 41 | A | B | A | A |
| | 42 | A | B | A | A |
| | 43 | A | B | A | A |
| | 44 | A | B | A | A |
| | 45 | A | B | A | A |

TABLE 5-continued

| | | Evaluation result (2) | | | |
|---|---|---|---|---|---|
| | | First ink | | Second ink | |
| | | Sticking recovery property | Image unevenness | Sticking recovery property | Image unevenness |
| Reference Example | 5 | A | A | A | A |
| | 6 | A | A | A | A |
| Comparative Example | 6 | D | — | D | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-189025, filed Oct. 4, 2018, which is hereby incorporated by reference herein in its entirety.

What is claimed is:

1. An ink jet recording method of recording an image on a recording medium using an ink jet recording apparatus, the ink jet recording apparatus including a recording head having (i) an ejection orifice array with ejection orifices configured to eject aqueous ink containing a pigment arranged in an arrangement direction, (ii) a recording element generating energy for ejecting the aqueous ink, and (iii) an ink flow path including a first flow path and a second flow path allowing the ejection orifice and the recording element to communicate with each other and through which the aqueous ink flows between the ejection orifice and the recording element, the ink jet recording apparatus further including a recovery mechanism for recovering an ejection state of the aqueous ink from the ejection orifices, the recovery mechanism including a suction wiper formed by combining a wiper of an elastic material and a suction unit configured to suck the aqueous ink in the ink flow path from the ejection orifices, the ink jet recording method comprising at least one of:
a first cleaning step of causing the aqueous ink in the first flow path to flow to the second flow path simultaneously with sucking the aqueous ink in the ejection orifices while wiping a surface on which the ejection orifice array is formed in the arrangement direction of the ejection orifice array with the suction wiper; and a second cleaning step of causing the aqueous ink in the first flow path to flow to the second flow path after sucking the aqueous ink in the ejection orifices while wiping the surface on which the ejection orifice array is formed in the arrangement direction of the ejection orifice array with the suction wiper.

2. The ink jet recording method according to claim 1, wherein the aqueous ink in the first flow path is flowed to the second flow path at a flow rate of 1.0 m/s or more.

3. The ink jet recording method according to claim 1, wherein the recording head further includes a mechanism for heating the aqueous ink in the recording head.

4. The ink jet recording method according to claim 1, wherein a dynamic surface tension of the aqueous ink at a lifetime of 10 milliseconds is 48 mN/m or less.

5. The ink jet recording method according to claim 1, wherein the aqueous ink contains a water-soluble organic solvent having a dielectric constant of 40.0 or more.

6. The ink jet recording method according to claim 5, wherein a content (% by mass) of the water-soluble organic solvent having a dielectric constant of 40.0 or more in the aqueous ink is 1.0% by mass or more to 20.0% by mass or less based on the total mass of the ink.

7. The ink jet recording method according to claim 1, wherein the pigment is a self-dispersible pigment, and the first cleaning is performed.

8. The ink jet recording method according to claim 1, wherein the aqueous ink includes a first ink containing a self-dispersible pigment and a second ink containing a resin-dispersed pigment and the ejection orifice array includes a first ejection orifice array ejecting the first ink and a second ejection orifice array ejecting the second ink, wherein the ink jet recording method further comprises:

flowing the first ink in the first flow path to the second flow path simultaneously with sucking the first ink in the ejection orifices while wiping a surface on which the first ejection orifice array is formed in an arrangement direction of the first ejection orifice array, with the suction wiper; and sucking the second ink in the ejection orifices while wiping a surface on which the second ejection orifice array is formed in the arrangement direction of the second ejection orifice array with the suction wiper and without allowing the second ink in the first flow path to flow to the second flow path.

9. The ink jet recording method according to claim 1, wherein the aqueous ink in the first flow path is flowed to the second flow path at a flow rate of 10.0 m/s or less.

10. The ink jet recording method according to claim 1, wherein a dynamic surface tension of the aqueous ink at a lifetime of 10 milliseconds is 35 mN/m or more.

11. The ink jet recording method according to claim 1, wherein a content (% by mass) of the pigment in the aqueous ink is 0.5% by mass or more to 15.0% by mass or less based on the total mass of the ink.

12. The ink jet recording method according to claim 1, wherein the suction wiper has a blade-like partial structure.

13. The ink jet recording method according to claim 1, wherein the recording element substrates are arranged in line with each other.

14. The ink jet recording method according to claim 1, wherein causing the aqueous ink in the first flow path to flow to the second flow path includes a circulating process of flowing the aqueous ink without discharging the aqueous ink from the ejection orifice.

* * * * *